United States Patent [19]
Huber et al.

[11] Patent Number: 5,404,758

[45] Date of Patent: Apr. 11, 1995

[54] FLOWMETER FOR DETERMINING FLOWING MEDIUMS

[75] Inventors: Erich Huber; Gerhard Gasper, both of München, Germany

[73] Assignee: Knorr-Bremse AG, Germany

[21] Appl. No.: 115,537

[22] Filed: Sep. 3, 1993

[30] Foreign Application Priority Data

Sep. 3, 1992 [DE] Germany .............. 42 29 382

[51] Int. Cl.⁶ .................................. G01F 1/26
[52] U.S. Cl. ..................................... 73/861.58
[58] Field of Search .............. 73/861.53–861.58

[56] References Cited

U.S. PATENT DOCUMENTS

| | | | |
|---|---|---|---|
| 2,377,861 | 6/1945 | Brewer | 73/861.57 |
| 2,523,666 | 9/1950 | Moth | 73/861.54 X |
| 3,805,611 | 8/1974 | Hedland | 73/861.58 |
| 4,487,077 | 12/1984 | Lake | 73/861.58 |
| 4,864,871 | 9/1989 | Larner | 73/861.53 X |
| 4,993,269 | 2/1991 | Guillaume et al. | 73/861.53 |
| 5,086,654 | 2/1992 | Malminen | 73/861.58 |

FOREIGN PATENT DOCUMENTS

687835 3/1965 Italy ................. 73/861.58

*Primary Examiner*—Herbert Goldstein
*Attorney, Agent, or Firm*—Pollock, Vande Sande & Priddy

[57] ABSTRACT

A flowmeter for determining the amount of flowing medium using an orifice (4) and a resistor body (5) in a cavity (6) through which the medium to be measured flows. Not the resistor body (5) but an orifice sleeve (4) is displaced as a consequence of the varying primary pressure and thus the degree of opening of the flow orifice is determined depending on the amount of flow of the flowing medium. A satisfactory linearization of the subregion of the function $\Delta p\ (\dot{V})$ is obtained.

14 Claims, 6 Drawing Sheets

5,404,758

FLOWMETER FOR DETERMINING FLOWING MEDIUMS

FIELD OF THE INVENTION

The present invention relates to a flowmeter for determining flowing mediums, in particular a flowing gas, within a pressure line of a brake system of a vehicle, preferably a rail car.

BACKGROUND OF THE INVENTION

Flowmeters to determine the amount of flowing medium using an orifice and a resistor in a cavity having inlet and outlet openings are known from Offenlegungsschrift DE 37 13 542. A flow velocity measuring device can be inferred from this document. Owing to the pressure differential that is measured upstream and downstream of an orifice, the flow velocity of the medium is determined. The opening surface of this orifice is variable, so that the differential pressure can be held constant by means of an actuator as a function of the flowing medium. This orifice is firmly integrated into the body of the flow velocity measuring device. The tapered valve body is pressurized with a spring force in the direction of the opening of the orifice, so that the actuator opens against the spring force of the flow opening of the orifice. The differential pressure is measured in this device by means of two sensors, which produce an electrical signal and convey that signal to an electronic circuit. From this differential pressure and the lift of the valve body, a flow coefficient is calculated in order to determine the flow velocity.

The drawback of this prior art device is that the mechanism is too complicated and, therefore, its manufacture is not cost effective.

Furthermore, with such a device the flow volume is limited to a relatively small flow rate per unit of time and the reaction surface on the orifice cannot be made arbitrarily large during its construction, so that definite limitations must be accepted.

When braking or releasing a pneumatic railway brake, rates of air flow per unit of time may range from a few liters per minute up to >6,000 liters per minute in extreme cases. The requisite amount of air depends on the length of the air pressure line, i.e., for the application of a pneumatic brake of a train, the length of the train. Since this length varies widely, the rate of air flow fluctuates widely.

When a new train is assembled, one proceeds on the assumption of full brake application, and thus the volume of supplied air is measured up to the full release of the train and this value is stored. At every additional release operation, the volume flowing into the main line during the release operation is always compared with the stored value, whereby changes in the train configuration (e.g., inadvertent closing of a shutoff valve in a car) or other abnormal occurrences can be detected.

Therefore, it is important to determine relatively accurately the flowing gas during brake control. Such flow measurement can be made by the so-called free float flow measurement method, which is based on a resistor body around which a medium flows. The resistor body is either located in a conical measurement pipe or the resistor body itself is conical and located near the flow opening of an orifice meter. The resistance value $c_w$ of the free float body varies as a function of the distance to the orifice meter. Thus, the force F exerted by the medium on the resistor body is proportional to the resistance value $c_w$. The correlation of the force F with the flow velocity results from the law of resistance known from aerodynamics.

SUMMARY OF THE INVENTION

The object of the invention is to provide a flowmeter that assures a somewhat linear course $\Delta p\ (\dot{V})$, is simple in its construction, inexpensive to produce and sturdy in use.

The flowmeter according to the invention for determining the amount of flowing medium using an orifice meter and a resistor body in a cavity with an inlet and an outlet opening, where the differential pressure between the inlet and the outlet is measured by means of the orifice meter, is characterized by the fact that the orifice meter, which is loaded with a return force, can be moved axially from a first defined point; that the resistor body comprises at least one longitudinal overflow groove of variable cross-sectional area; and that the position of the resistor body is axially adjustable.

It is advantageous and important for the present invention that the orifice meter be loaded with the force of a variably adjustable return spring. The orifice meter itself is in the form of a sleeve which can be moved axially between two defined points by the pressure or force of the flowing medium. The orifice sleeve is guided by means of a cylindrical resistor body, on whose surface there is at least one longitudinal overflow groove. It is highly desirable for the resistor body to be moved axially by means of a threaded rod, thus permitting optimal adjustment relative to the exact flow point of the orifice to be located approximately at the start of the overflow groove in the direction of flow. Thus the overflow groove is somewhat excluded from the flow of the medium, so that a so-called leakage rate can flow through the flowmeter only in this first defined position.

This leakage rate represents the initial flow of the flowmeter and is non-linear as a function of the differential pressure ($\Delta p$). To assure this leakage rate, it is advantageous to integrate into the reaction surface of the orifice meter at least one groove that bridges the stop surface of the first defined stop point. This measure prevents "fluttering" of the measuring sleeve.

In order to provide the resistor body with an adequate hold, the end of the resistor body opposite the threaded rod is advantageously provided with a sliding guide in the form of a bore hole.

The fittings to the guide surfaces of the orifice sleeve are preferably selected so as to assure a desired leakage rate. It is also advantageous to make the guide surfaces wear resistant.

It is also advantageous with respect to a sturdy design to sense the differential pressure $\Delta p$ generated by the orifice meter independently by means of two pressure sensors and to convey the electric signals generated by these pressure sensors to an electric circuit for further processing.

BRIEF DESCRIPTION OF THE DRAWINGS

The present invention will now be described in detail with reference to the drawings.

DESCRIPTION OF PREFERRED EMBODIMENT

Figure 1:
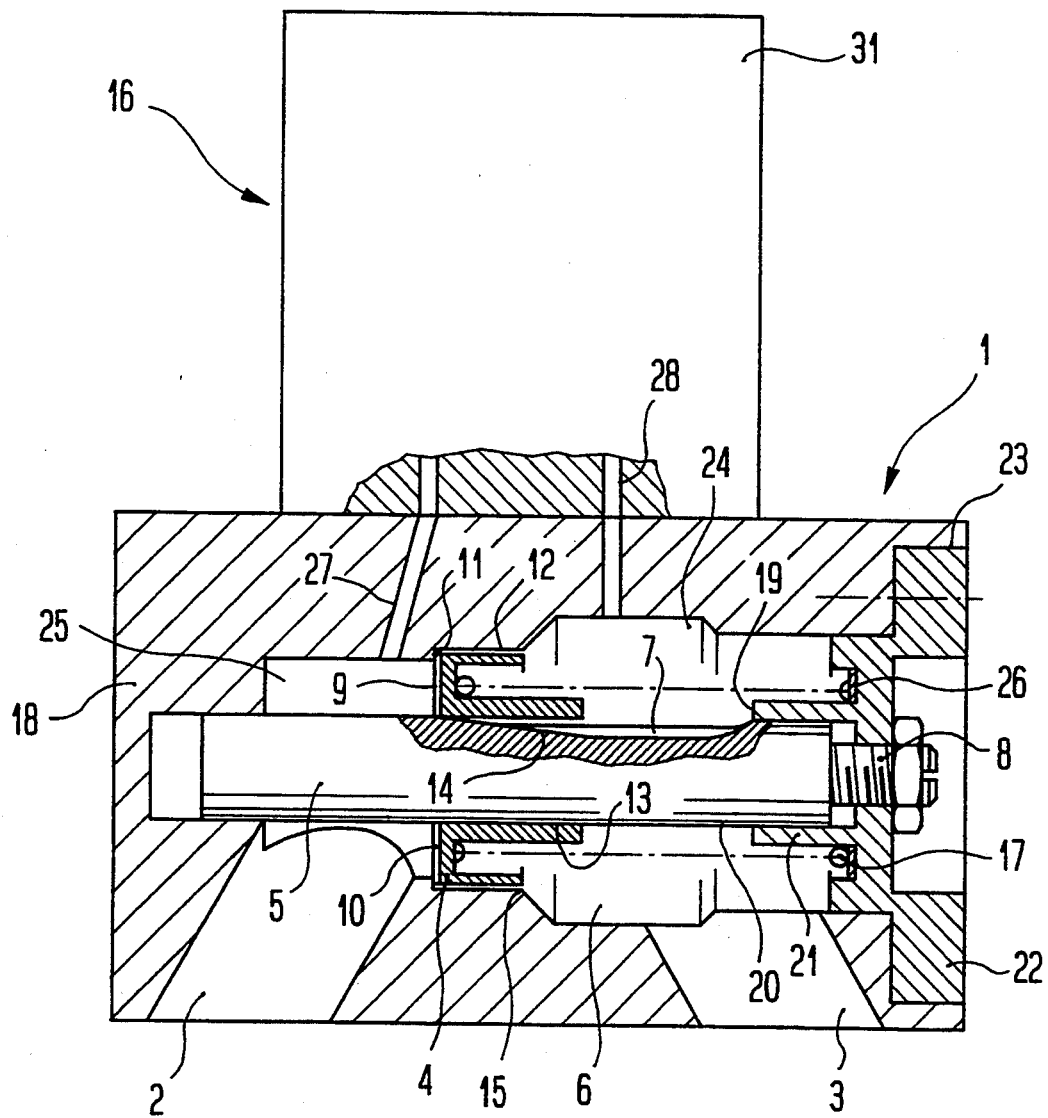
FIG. 1 is a sectional view of the device according to the invention for measuring the flow of flowing media.

FIG. 1 is a schematic sectional view of a flowmeter according to the invention for determining flowing medium. The flowmeter 1 according to the invention comprises the orifice meter 4 and the resistor body 5, both of which are arranged in the flow channel between the inlet opening 2 and the outlet opening 3. The line (not illustrated) through which the medium to be measured flows is attached to the openings 2, 3.

The gas stream to be measured enters the inlet opening 2, so that a pressure (p1) is produced in the space upstream of the orifice meter 4. This pressure exerts a force (F) on the reaction surface 9 and thus pushes the orifice sleeve 4 back against the force of the spring 17 until the two forces come into equilibrium.

In the quiescent state, the reaction surface 9 of the orifice meter 4 makes contact with the stop surface 11 of the first defined stop point. In this position of the measuring sleeve 4, only a low leakage rate flows by way of the grooves 10, which extend radially on the reaction surface 9, into the spaces between the housing 18 and the sliding surface of the orifice sleeve 4. Therefore, the sleeve and the bore hole must be provided with a corresponding fitting in order to assure the so-called zero leakage rate. This at least one groove 10 according to the invention on the reaction surface 9 of the orifice meter 4 is especially important for the quiescent behavior of the axially moveable orifice meter 4. Without this groove 10, the orifice meter 4 would perform, depending on the weight and the friction, a natural frequency vibration that can endanger the reliability of the flow meter.

The narrow air gap between the guide surface 12 and the housing 18 provides an effective throttle.

Especially important for flawless axial displacement from the first defined stop point 11 to the second defined stop point 19 is the flawless guidance of the measuring sleeve 4, by means of guide bars 20 between the overflow grooves 7 in the resistor body 5, on which the orifice sleeve 4 with its internal sliding surface 13 is guided with low friction.

The second defined stop point 19 is the upper edge of a stationary sleeve 21, whose bore receives one end of the resistor body 5 and offers it a reliable retention.

In the present embodiment of the invention there are three overflow grooves 7 on the upper surface of the resistor body 5. The contour 14 of the grooves corresponds to a mathematical function, whose first approximation corresponds to a quadratic function. On the basis of this specific curve shape, it is possible to linearize the function $\Delta p\ (\dot V)$ in a specific range between 200 and 3,000 liters per minute. In other words, the curve shape can be made virtually linear by geometric shaping of the overflow grooves.

Another way of adjusting the oscillatory system of the orifice meter 4 is provided by the variable compression spring 17. The spring force of the compression spring can be adjusted to a limited degree, if the cover on its outer circumference comprises a thread 23. Alternatively, the compression spring 17 can be prestressed more or less by embedding a spacer ring 26 into a groove in an axially screwed cover 22.

The threaded rod 8, with which the resistor body 5 can be moved axially, permits further fine tuning of the flow measurement. With these inventive steps to tune an accurate measurement, good measurement results were obtained that enabled linearization of the function $\Delta p\ (\dot V)$ in a specific range of measurement by simple means.

The cavity 24 downstream of the measuring sleeve 4 has a substantially larger diameter than the cavity 25 upstream of the orifice sleeve 4. Due to this widening of the cavity 24 downstream of the orifice meter 4 upon displacement of the orifice sleeve 4 beyond the opening point 15, very large volumes ($\dot V > 6,000$ liters per minutes) can flow for a short time through the flowmeter without having access to a more precise measurement. This is the case when a so-called "filling surge" is effected by the conductor of a railway train.

Two measuring bores 27, 28 lead from the cavities 24, 25 to the pressure sensors 29, 30, which sense the pressure upstream and downstream of the orifice meter 4. These measurement sensors 29, 30 generate an electrical signal. The sensors are located in a housing 31 which is located above the body of the flowmeter.

Figure 2:
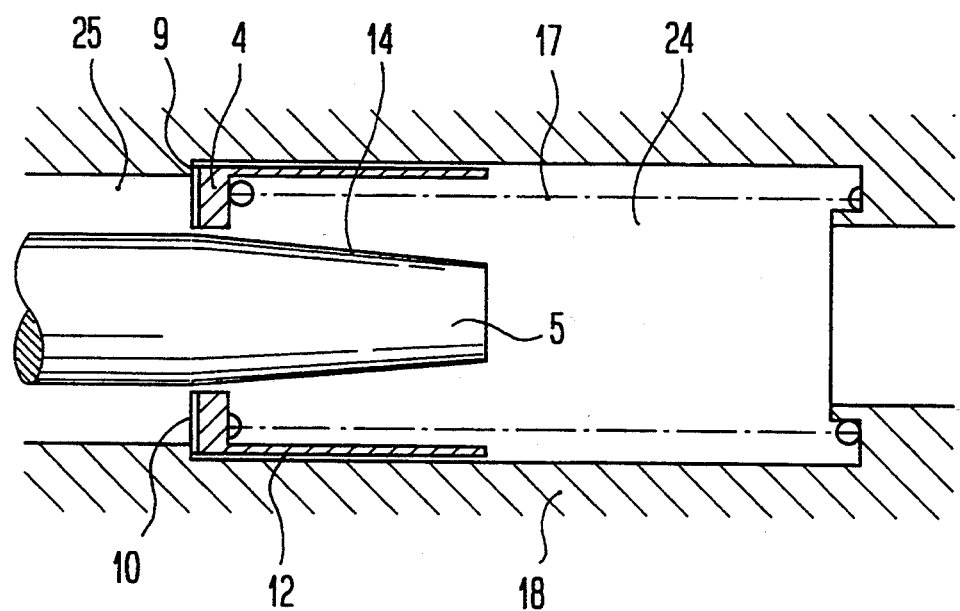
FIG. 2 is a sectional view of another embodiment of the orifice meter (4) and the resistor body (5) according to the invention.

FIG. 2 shows a another embodiment according to the invention, where the same parts are provided with the same reference numerals. In this embodiment, the measuring sleeve is also forced back against the force of the compression spring 17 as a consequence of the pressure on the reaction surface 9 of the orifice sleeve 4, thereby increasing the flow area of the flowmeter since the resistor body 5 is substantially conical. In the normal position, the orifice meter 4 is located at the thicker end of the frustoconical resistor body 5. In this position, a zero leakage rate flows, as described above, as a consequence of the groove 10 and the space between the guide surface 12 and the housing body 18. By means of a suitable contour 14 of the truncated cone, linearization of a subregion of the function $\Delta p\ (\dot V)$ can also be obtained.

Figure 3:
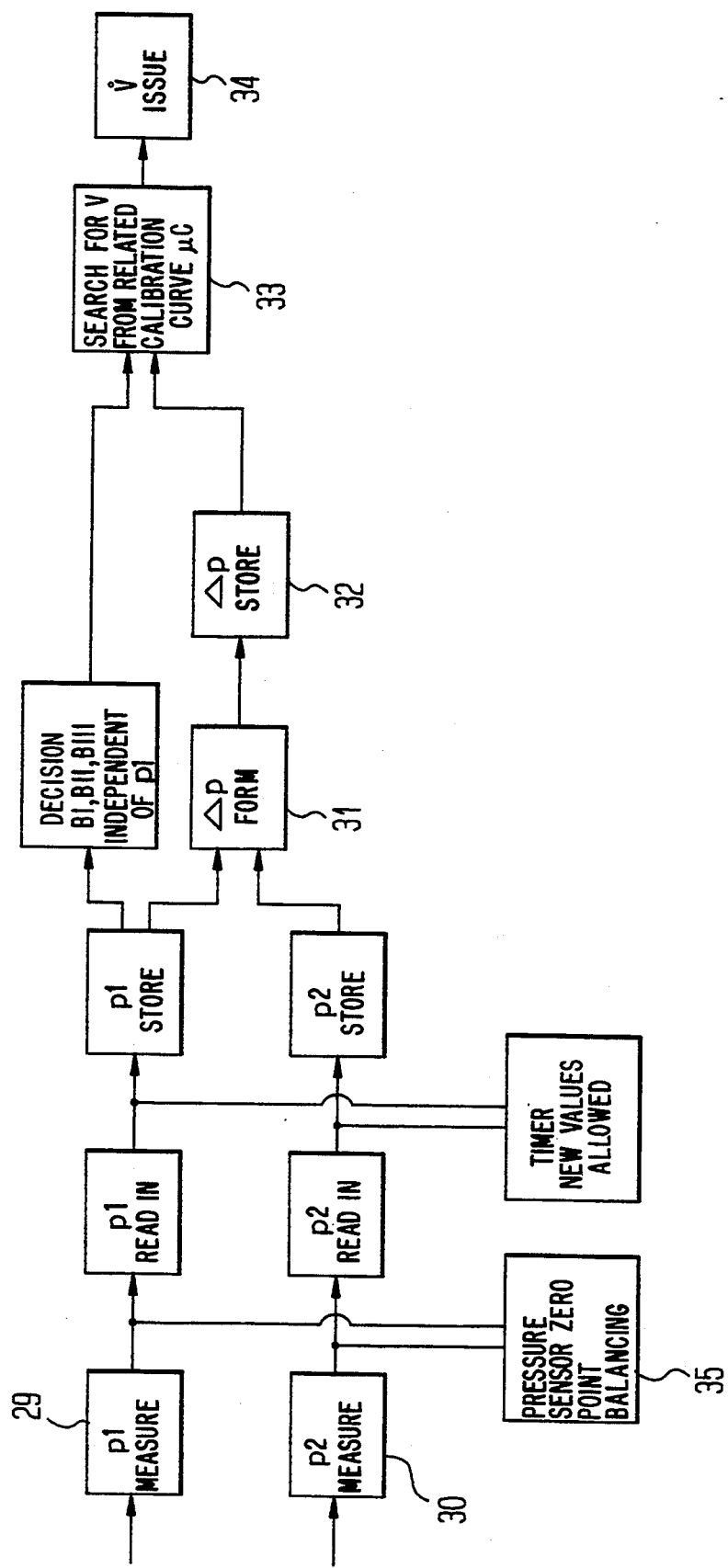
FIG. 3 is a block diagram of the electronic circuit downstream of the sensors sensing the pressure with two relative pressure sensors (29, 30).

FIG. 3 is a block diagram of the electronic circuit for processing the sensor signals. The pressures (p1) in the space 25 upstream of the orifice and (p2) in the space 6 downstream of the orifice are conveyed to the electronic input circuits 29, 30. These analog signals are converted into digital signals and stored. By subtracting the values p1−p2 in the unit 31, the differential pressure $\Delta p$ is calculated and thereafter stored in the unit 32. Knowing (p1), a corresponding $\dot V$ value is assigned to each $\Delta p$ through access to a correspondingly plotted calibration curve in memory by means of a software program stored in a microcomputer 33, and this $\dot V$ value is stored. This $\dot V$ signal can be further processed by means of a digital interface 34 and following digital-/analog conversion displayed on a display (not illustrated).

By means of a subprogram controlled by the source program, the zero point deviations, e.g., as a consequence of the temperature effect or aging of both pressure sensors 29, 30, are made with a unit 35 for zero point balancing.

With the aid of an error program, the input pressures and the differential pressure are checked, and in the case of an error a signal is then emitted.

Figure 4:
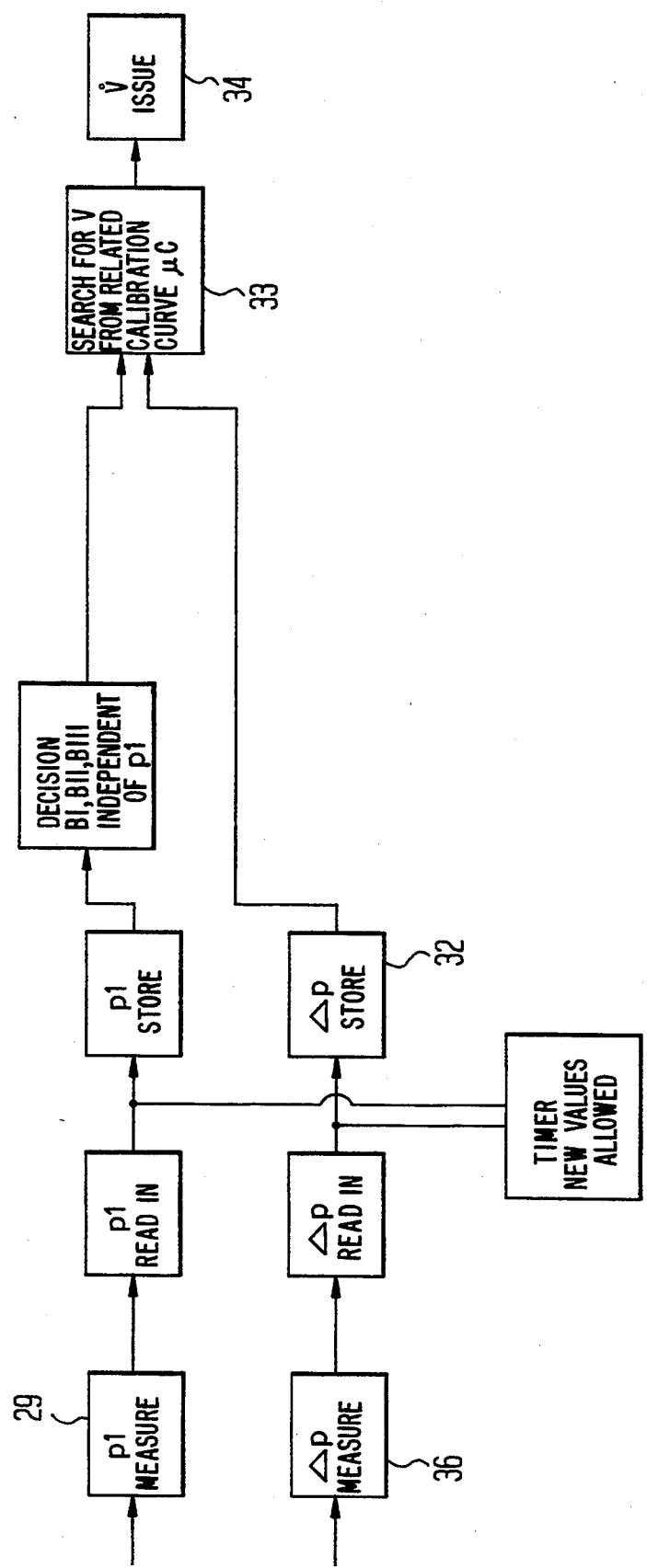
FIG. 4 is a block diagram of the electronic circuit downstream of the sensors sensing the pressure and including one relative pressure sensor (29) and one differential pressure sensor (36).

FIG. 4 depicts a variant of FIG. 3 for treatment and further processing of the pressures upstream and downstream of the orifice meter.

Here, the pressure (p1) in the space 25 is measured by the sensor 29 and the differential pressure Δp (p1−p2) is measured directly by means of the sensor 36, converted from analog to digital and conveyed to subsequent electronics for further processing, as described above with respect to FIG. 3.

Figure 5:
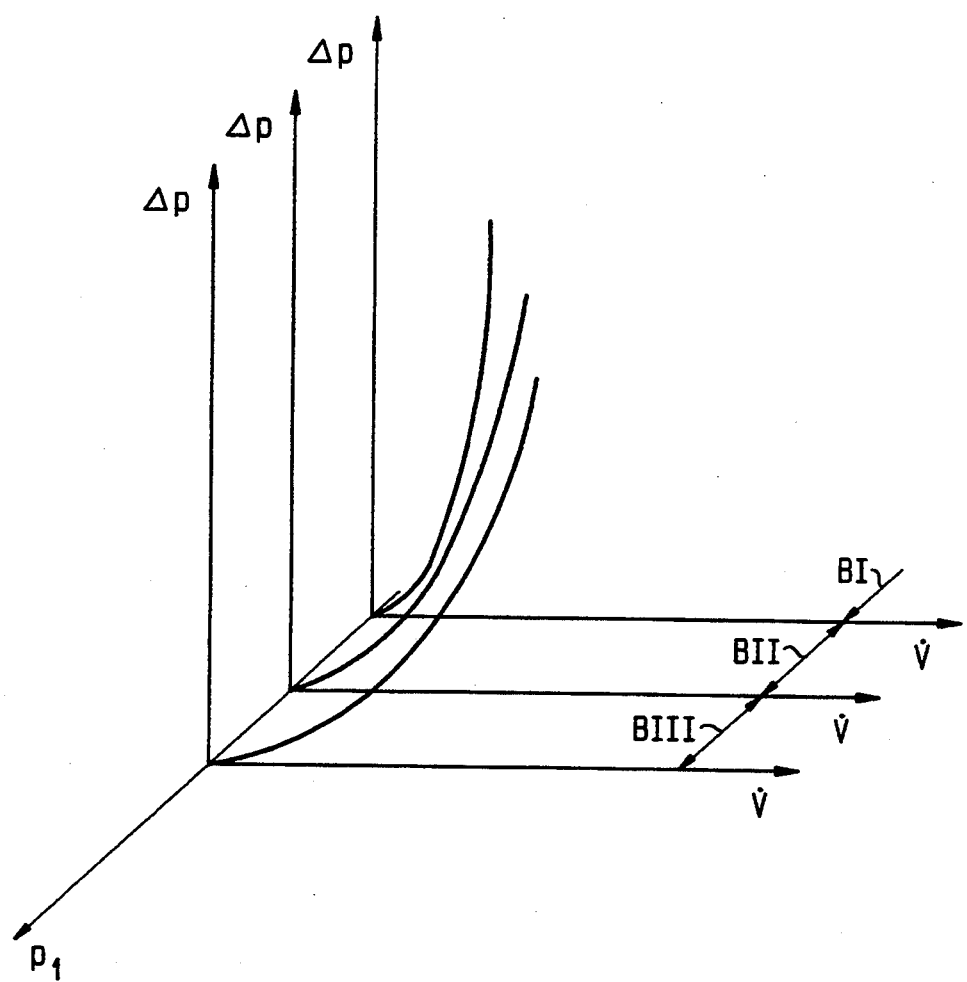
FIG. 5 is a diagram showing the qualitative relation between $\Delta p$ and $\dot V$ for three different measuring ranges (BI, BII, BIII).

FIG. 5 shows the functional relation between the differential pressure Δp and the specific volume rate of flow V̇ for three different primary measuring ranges BI, BII, BIII. The measuring range BI extends, for example, from 0 to <7 bar; the measuring range BII, from >7 to <8.5; and the measuring range BIII, from >8.5 to 10 bar. It is apparent from this drawing that the slope of the curve is very much steeper in the measuring range BI than in the measuring range BIII, because a lower primary pressure results in a smaller displacement of the orifice meter and thus a smaller volume rate of flow. To gauge the effect of the primary pressure and all of the operating tolerances on the volume rate of flow V̇, characteristic calibration curves are sensed empirically for each device and stored as the parameter table or as the mathematical function in a suitable electronic memory.

Figure 6:
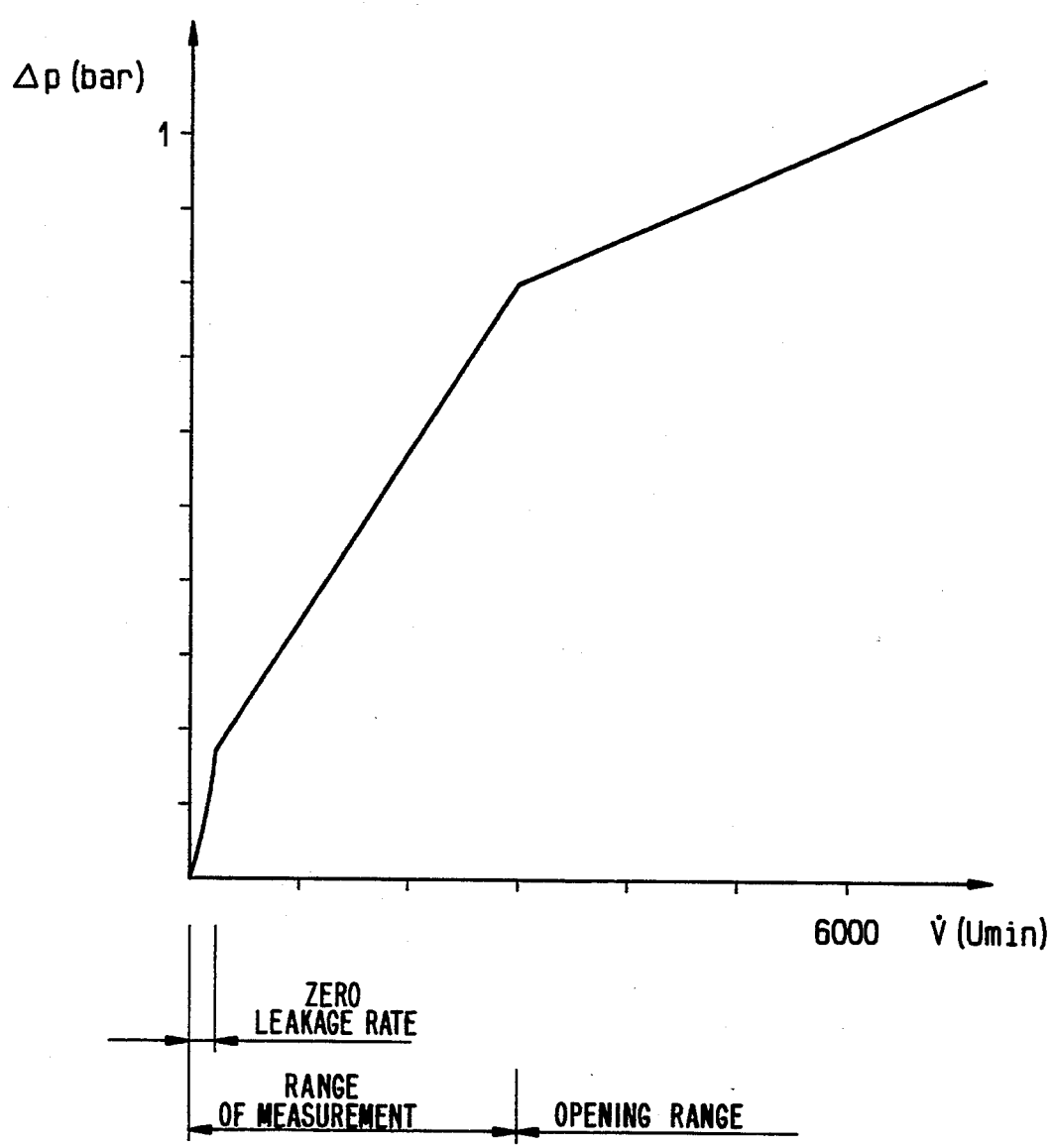
FIG. 6 is a graph of the relation between the differential pressure $\Delta p = p1 - p2$ and the volume rate of flow $\dot V$.

FIG. 6 shows a graph which reproduces the relation between the differential pressure Δp=p1−p2 as a function of the volume rate of flow V̇ of a curve measured at the flowmeter according to the invention. The aforementioned zero leakage rate, whose course in non-linear, flows in the measuring range between 0 and <0.2. The range that is significant for the present application lies between 0.2 and 1 bar. This range was obtained with the described measures according to the invention in order to measure accurately the flow of a flowing medium.

The invention provides the advantage, by use of the orifice sleeve 4, that a relatively large reaction surface 9 is available for the dynamic pressure (p1). Furthermore, a simple, non-complicated device is provided by the arrangement of the resistor body 5 and the orifice sleeve 4; this device assures satisfactory linearization of the function Δp (V̇) by means of the shape of the overflow grooves or contours.

The significant reduction in the risk of forced oscillation of the orifice sleeve 4 by means of the volume rate of flow by way of the stationary nozzle prior to opening the control sleeve constitutes a great advance over the prior art.

Substantially hysteresis-free guidance of the orifice sleeve 4 is obtained by the internal guides according to the invention. Especially important for the accurate measurement and linearization of the characteristic is the inventive design of the orifice geometry and the variation of the prestress of the control spring 10, and the axial displacement 10 of the resistor body 5, as well as the pressure range definition by means of the first and second stop points and the passage switching of the flowmeter through the opening point 15 of the orifice meter 4 according to the invention.

What is claimed is:

1. Flowmeter for determining an amount of flowing medium, said flowmeter comprising an orifice sleeve (4) and a generally cylindrical resistor body (5) in a cavity (6) having an inlet opening (2) and an outlet opening (3), a differential pressure between said inlet opening and said outlet opening being measured by means of said orifice sleeve (4), said flowmeter further comprising:
   (a) means for loading said orifice sleeve (4) with a restoring force, said orifice sleeve being moved axially from a first defined point by pressure of said flowing medium against said restoring force;
   (b) said resistor body (5) comprising at least one longitudinal overflow groove (7) of variable cross-sectional area;
   (c) means for axial adjustment of a position of said resistor body (5); and
   (d) at least one further groove (10) located in a reaction surface (9) of said orifice sleeve (4) facing in the direction from which fluid flows and bridging a stop surface (11) of said first defined stop point.

2. Flowmeter as claimed in claim 1, wherein the restoring force of said orifice meter (4) is variable.

3. Flowmeter as claimed in claim 1, wherein said resistor body (5) is moved axially by means of a threaded rod (8) connected to said resistor body (5).

4. Flowmeter as claimed in claim 3, wherein an end of said resistor body (5) remote from said threaded rod (8) is slidingly guided by means of a bore hole.

5. Flowmeter as claimed in claim 1, wherein said orifice sleeve (4) is moved axially between said first defined stop point (11) and a second defined stop point (19).

6. Flowmeter as claimed in claim 1, wherein said first defined point is located near a start of said overflow groove (7) in a direction of flow of said flowing medium.

7. Flowmeter as claimed in claim 1, wherein said at least one groove (7) has a square enlargement of the cross-sectional area in the flow direction.

8. Flowmeter as claimed in claim 1, wherein said orifice sleeve (4) is guided on said resistor body (5).

9. Flowmeter as claimed in claim 1, wherein said resistor body (5) is shaped as a truncated cone having a larger base adjacent said first defined stop point (11).

10. Flowmeter as claimed in claim 1, wherein said orifice sleeve (4) is guided by guide surfaces (12, 13) with fittings chosen to produce a desired leakage rate.

11. Flowmeter as claimed in claim 10, wherein said guide surfaces (12, 13) are wear resistant.

12. Flowmeter as claimed in claim 1, wherein the differential pressure Δp upstream and downstream of said orifice meter (4) are sensed independently of each other by means of two pressure sensors (29, 30) and said two pressure sensors generate electrical signals.

13. Flowmeter as claimed in claim 12, wherein said electrical signals are conveyed to an electric circuit for further processing.

14. Flowmeter as claimed in claim 1, wherein, upon displacement of said orifice sleeve beyond a point of increase in a diameter of said cavity, the flow of said medium is temporarily re-routed.

* * * * *